United States Patent Office 3,455,900
Patented July 15, 1969

3,455,900
PROCESS FOR SELECTIVELY PREPARING
LINCOMYCIN 7-ACYLATES
Robert D. Birkenmeyer, Comstock, and Thomas W. Brignall, Kalamazoo, Mich., assignors to The Upjohn Company, Kalamazoo, Mich., a corporation of Delaware
No Drawing. Filed May 19, 1967, Ser. No. 639,616
Int. Cl. C07c 95/04; C07d 27/56
U.S. Cl. 260—210                                    15 Claims

ABSTRACT OF THE DISCLOSURE

Process for producing lincomycin 7-acylates by alcoholysis of lincomycin 2,3,4,7-tetraacylates or lincomycin 2,7-diacylates. This process is superior to prior art processes for making lincomycin 7-acylates because of its specificity for making lincomycin 7-acylates only. Lincomyin 7-acylates are antibacterial agents.

BRIEF SUMMARY OF THE INVENTION

This invention relates to a novel process for making lincomycin 7-acylates, and is particularly directed to a process for making lincomycin 7-acylates from lincomycin 2,3,4,7-tetraacylates or lincomycin 2,7-diacylates by alcoholysis of the starting material. The invention process unexpectedly produces lincomycin 7-acylates only, to the exclusion of other lincomycin acylates.

Lincomycin 7-acylates have been produced in the prior art by several methods. One method involves the acylation of lincomycin with a minimum amount of acylating agent. The product of this reaction generally results in a mixture of lincomycin 2- and 7-acylates as well as the presence of other lincomycin acylates, for example, lincomycin di-, tri- and tetraacylates. In such a procedure, it is necessary to conduct a separation of the various acylates in order to isolate and purify the desired lincomycin 7-acylate. Such a process is both time consuming and expensive. In another prior art process for making lincomycin 7-acylate, lincomycin 2,7-diacylate is subjected to acid hydrolysis. Such a process is very difficult to control as it is somewhat destructive. Also, the acid hydrolysis process does not produce lincomycin 7-acylate only. Generally, upon the acid hydrolysis of lincomycin 2,7-diacylate, there is produced a mixture of lincomycin 2-acylate and lincomycin 7-acylate which then must be resolved by countercurrent distribution in order to obtain pure lincomycin 7-acylate. As is readily apparent, such a process is also time consuming and expensive.

It was unexpectedly discovered that upon alcoholysis of lincomycin 2,3,4,7-tetraacylates or lincomycin 2,7-diacylates the acyl group on the 7 position of the lincomycin molecule remained on the molecule while the other acylates were separated therefrom. This unobvious property has been used to develop the invention process for making lincomycin 7-acylates.

DETAILED DESCRIPTION

In carrying out the process of the invention, lincomycin 2,3,4,7-tetraacylates or lincomycin 2,7-diacylates are used as the starting material. Processes for making lincomycin 2,3,4,7-tetraacylates, wherein the acyl group is a hydrocarbon carboxylic acid acyl of from 2 to 12 carbon atoms, inclusive, are described in the examples in copending application Ser. No. 359,425, filed on Apr. 13, 1964, now patent No. 3,326,891. Processes for making lincomycin 2,7-diacylates, wherein the acyl group is a hydrocarbon carboxylic acid acyl of from 2 to 12 carbon atoms, inclusive, are described in U.S. Patent 3,282,918. Lincomycin 2,3,4,7-tetraacylates and lincomycin 2,7-diacylates, wherein the acyl radical is a hydrocarbon carboxylic acid acyl of from 12 to 18 carbon atoms, inclusive, can be prepared by substituting the following carboxylic acids: luric triadecoic, myristic, pentadecanoic, palmitic, margaric, and stearic, in the processes disclosed in application Ser. No. 359,425 and U.S. Patent 3,282,918.

In the process of the invention, lincomycin 2,3,4,7-tetraacylate or lincomycin 2,7-diacylate is dissolved in an alcohol, advantageously of from 1 to 8 carbon atoms, and heated at reflux for a period of about 3 to 6 days. Suitable alcohols are methanol, ethanol, propanol, butanol, pentanol, hexanol, heptanol, octanol, and isomers thereof.

The temperature of the reaction can be varied between about 0° C. and about 100° C. As will be discussed more fully hereinafter, the temperature of the reaction can be varied along with other factors to control the time of completion of the reaction.

The invention process encompasses the use of lincomycin 2,3,4,7-tetraacylates and lincomycin 2,7-diacylates, wherein the acyl group is a hydrocarbon carboxylic acid acyl of from 2 to 18 carbon atoms, inclusive, as starting materials.

The time of completion of the invention process can be shortened, advantageously, by use of a base catalyst, for example, an alkali metal hydroxide, alkali metal carbonate, or alkali metal alkoxide of from 1 to 8 carbon atoms. Examples of such base catalysts are sodium hydroxide, potassium hydroxide, sodium methoxide, sodium ethoxide, and potassium bicarbonate.

When using a base catalyst, as described above, the ratio of lincomycin acylate starting material and base catalyst, as well as temperature of the reaction, will govern the time necessary to complete the reaction. For example, when 0.01 mole of lincomycin 2,3,4,7-tetraacetate is dissolved in 100 ml. of methanol, which is then catalysed with 0.01 mole of sodium hydroxide, and the reaction is maintained at about 25° C., about 80% of the starting material is deacylated to lincomycin 7-acetate in about 3 min. When 0.001 mole of sodium hydroxide is used instead of 0.01 mole in the above reaction, 30% of the starting material is deacylated to lincomycin 7-acetate in about 3 min. The use of other base catalysts gives similar results. For example, when 0.01 mole of lincomycin 2,3,4,7-tetraacetate is dissolved in 100 ml. of methanol and 0.0045 mole of sodium methoxide is added, and the reaction is maintained at about 25° C., 90% of the starting material is converted to lincomycin 7-acetate in about 3 min. Thus, the time of completion of the above base-catalysed deacylation can be shortened or lengthened by varying the mole ratio of starting material to catalyst. The optimum ratio, when the temperature of the reaction is about 25° C., is a ratio of about 0.01 mole of lincomycin 2,3,4,7-tetraacylate to 0.0045 mole of base catalyst. When the temperature of the reaction is maintained at about 25° C., and the ratio of lincoycin 2,3,4,7-tetraacylate to base catalyst is 0.01 of tetraacylate to 0.0001–0.01 of catalyst, the time for the completion of the reaction will range from 1 min. to 2 hrs.

In addition to varying the ratio of the starting material and the base catalyst, the temperature of the reaction can be varied advantageously from 0° C. to 25° C. in the above base-catalysed process. The lower the temperature, the longer the reaction time.

The above conditions for the base-catalysed process for making lincomycin 7-acylate from lincomycin 2,3,4,7-tetra-acylates are applicable when lincomycin 2,7-diacylate is the starting material except that the ratio of starting material to base catalysts is scaled down about two-thirds. For example, instead of using 0.0045 mole of sodium methoxide for 0.01 mole of starting material, as given above for lincomycin 2,3,4,7-tetraacylate, only 0.0015 mole of sodium methoxide is used. Thus, 0.01 mole of lincomycin 2,7-diacetate dissolved in 100 ml. of methanol and using 0.0015 mole of sodium methoxide, at a temperature of 25° C., will result in about 90% deacylation of the starting material to lincomycin 7-acetate in about 3 min.

Lincomycin 7-acylates are antibacterially active. For example, lincomycin 7-acetate is active against the bacteria *Staphylococcus aureus, Streptococcus hemolyticus, Streptococcus faecalis,* and *Bacillus subtilis.* Accordingly, lincomycin 7-acylates can be used to minimize or prevent odor in fish and fish crates caused by *Bacillus subtilis.* Also, lincomycin 7-acylate can be used as a disinfectant on various dental and medical equipment contaminated with *Staphylococcus aureus*; it also can be used as a disinfectant on washed and stacked food utensils contaminated with *Staphylococcus aureus.*

The following examples are illustrative of the process of the present invention, but are not to be construed as limiting. All percentages are by weight and all solvent mixture proportions are by volume unless otherwise noted.

Example 1

A solution of 100 g. of lincomycin 2,3,4,7-tetraacetate dissolved in 1.5 l. of methanol was heated at reflux for 96 hours. The clear solution was evaporated to dryness under vacuum to give about 100 g. of a solid material. A portion of this crude material (45 g.) was chromatographed over 4 kg. of silica gel, with 1:6 methanol:chloroform as developing solvent, as follows:

| Fraction: | Ml. |
|---|---|
| Forerun | 3500 (discard). |
| 1–21 | 130 each (discard). |
| 22–46 | 130 each (save). |

The remaining portion of the above crude product was chromatographed in the manner described above, and the product fractions were combined and evaporated under vacuum to give 58 g. of an amber glass material. This material was dissolved in 1 liter of acetone, the solution was adjusted to pH 2 with aqueous HCl, and then diluted with 2 liters of acetone. The solid precipitate which formed was crystallized from water-acetone (1:60), collected and dried; yield, about 47 g. of lincomycin 7-acetate having a melting point of 177–179° C. This material was dissolved in water and freeze dried.

*Analysis.*—Calc'd for $C_{20}H_{36}N_2O_7S \cdot HCl$: C, 49.52; H, 7.69; N, 5.78; S, 6.61; Cl, 7.31. Found: C, 45.96; H, 7.81; N, 5.42; S, 6.31; Cl, 7.04; $H_2O$, 4.51. Corrected for water: C, 49.41; H, 8.04; N, 5.68; S, 6.61; Cl, 7.37. Optical rotation: $[\alpha]_D^{25} = +136°$ (in water). Equivalent weight=485 (calc'd); 511 (found); 488 (corrected for $H_2O$).

Example 2

Lincomycin 2,7-diacetate base (20 g.) is dissolved in 150 ml. of methanol and heated at reflux for 120 hours. The solution is then evaporated to dryness under vacuum to yield a residue which is a clear amber material. This material is chromatographed over 1400 g. of silica gel, using 1:10 methanol: chloroform as developing solvent, as follows:

| Fraction: | Ml. |
|---|---|
| Forerun | 1500 (discard). |
| 1–29 | 63 each (discard). |
| 30–50 | 63 each (combine and evacuate under vacuum). |

The solids (13.5 g.) obtained from the above column are dissolved in 200 ml. of acetone. The solution is stirred vigorously and adjusted to pH 2 with aqueous HCl; a white solid precipitates. After stirring for 1 hr., the solution is filtered and the white solids are collected. The solids are dissolved in about 5 to 10 ml. of water, the solution warmed and filtered. The filtrate is stirred vigorously while 200 ml. of acetone is added. A solid material precipitates and stirring is continued for about 18 hrs. at 25° C. The solids are then collected and dried for 18 hrs. under vacuum at 50° C.; yield, about 10 g. of lincomycin 7-acetate having the following analysis, corrected for 5.12% water:

*Analysis.*—Calc'd for $C_{20}H_{36}N_2O_7S \cdot HCl$: C, 49.52; H, 7.69; N, 5.78; S, 6.61; Cl, 7.31. Found: C, 49.86; H, 7.76; N, 6.02; S, 6.61; Cl, 7.33.

Example 3

By substituting lincomycin 2,3,4,7- and 2,7-aceylates, wherein the acyl group is a hydrocarbon carboxylic acid acyl of from 3 to 18 carbon atoms, for the lincomycin 2,3,4,7-tetraacylate in Example 1 and lincomycin 2,7-diacetate in Example 2, respectively, there is obtained lincomycin 7-acylate, wherein the acyl group is a hydrocarbon carboxylic acid acyl of from 3 to 18 carbon atoms.

Example 4

Lincomycin 2,3,4,7-tetraacetate base (57.4 g.–0.1 mole) was dissolved in 1 liter of methanol and stirred vigorously at 25° C. Sodium methoxide (0.045 mole) was added in 1 portion. After about 3 min. stirring, 0.045 mole of hydrochloric acid was added. The reaction was evaporated to dryness under vacuum and the residual material purified by chromatography in the same manner as described above in Examples 1 and 2. Lincomycin 7-acetate, having the characteristics described above, was isolated.

We claim:

1. The process for selectively preparing lincomycin 7-acylate, wherein the acyl radical is a hydrocarbon carboxylic acid acyl of from 2 to 18 carbon atoms, inclusive, which comprises reacting lincomycin 2,3,4,7-tetraacylate or lincomycin 2,7-diacylate, wherein the acyl radical is as defined above, with a lower alkyl alcohol of from 1 to 8 carbon atoms, inclusive.

2. The process according to claim 1 for preparing lincomycin 7-acylate, wherein the acyl radical is a hydrocarbon carboxylic acid acyl of from 2 to 18 carbon atoms, inclusive, which comprises reacting lincomycin 2,3,4,7-tetraacylate, wherein the acyl radical is as defined above, with a lower alkyl alcohol of from 1 to 8 carbon atoms, inclusive.

3. The process according to claim 1 for preparing lincomycin 7-acylate, wherein the acyl radical is a hydrocarbon carboxylic acid acyl of from 2 to 18 carbon atoms, inclusive, which comprises reacting lincomycin 2,7-diacylate, wherein the acyl radical is as defined above, with a lower alkyl alcohol of from 1 to 8 carbon atoms, inclusive.

4. The process according to claim 1 wherein the lower alkyl alcohol is methanol.

5. The process according to claim 1 for preparing lincomycin 7-acetate which comprises reacting lincomycin 2,3,4,7-tetraacetate with methanol.

6. The process according to claim 1 for preparing lincomycin 7-acetate which comprises reacting lincomycin 2,7-diacetate with methanol.

7. The process according to claim 1 for preparing lincomycin 7-acylate, wherein the acyl radical is a hydrocarbon carboxylic acid acyl of from 2 to 18 carbon atoms, inclusive, which comprises reacting lincomycin 2,3,4,7-tetraacylate or lincomycin 2,7-diacylate, wherein the acyl radical is as defined above, with a lower alkyl alcohol of from 1 to 8 carbon atoms, inclusive, in the presence of a base catalyst.

8. The process according to claim 7 for preparing lincomycin 7-acylate, wherein the acyl radical is a hydrocarbon carboxylic acid acyl of from 2 to 18 carbon atoms, inclusive, which comprises reacting lincomycin 2,3,4,7-tetraacylate, wherein the acyl radical is as defined above, with a lower alkyl alcohol of from 1 to 8 carbon atoms, inclusive, in the presence of a base catalyst.

9. The process according to claim 7 for preparing lincomycin 7-acylate, wherein the acyl radical is a hydrocarbon carboxylic acid acyl of from 2 to 18 carbon atoms, inclusive, which comprises reacting lincomycin 2,7-diacylate, wherein the acyl radical is as defined above, with a lower alkyl alcohol of from 1 to 8 carbon atoms, inclusive, in the presence of a base catalyst.

10. The process according to claim 7 for preparing lincomycin 7-acylate, wherein the base catalyst is an alkali metal hydroxide, alkali metal carbonate, or alkali metal alkoxide of from 1 to 8 carbon atoms, inclusive.

11. The process according to claim 7 for preparing lincomycin 7-acylate wherein the base catalyst is sodium methoxide.

12. A process according to claim 7 for preparing lincomycin 7-acylate, wherein the acyl radical is a hydrocarbon carboxylic acid acyl of from 2 to 18 carbon atoms, inclusive, which comprises reacting 0.01 mole of lincomycin 2,3,4,7-tetraacylate or lincomycin 2,7-diacylate with a lower alkyl alcohol of from 1 to 8 carbon atoms, inclusive, in the presence of a base catalyst present in the range of about 0.01 mole to 0.0001 mole, at a temperature of about 0° C. to 100° C., for a time sufficient to remove all the acyl groups except the acyl at the 7-position.

13. A process according to claim 7 for preparing lincomycin 7-acylate, wherein the acyl radical is a hydrocarbon carboxylic acid acyl of from 2 to 18 carbon atoms, inclusive, which comprises reacting 0.01 mole of lincomycin 2,3,4,7-tetraacylate with a lower alkyl alcohol of from 1 to 8 carbon atoms, inclusive, in the presence of a base catalyst present in the range of about 0.01 mole to 0.0001 mole, at a temperature of about 0° C. to 100° C., for a time sufficient to remove the acyl groups at the 2, 3, and 4 positions of the lincomycin molecule.

14. A process according to claim 7 for preparing lincomycin 7-acylate, wherein the acyl radical is a hydrocarbon carboxylic acid acyl of from 2 to 18 carbon atoms, inclusive, which comprises reacting 0.01 mole of lincomycin 2,7-diacylate with a lower alkyl alcohol of from 1 to 8 carbon atoms, inclusive, in the presence of a base catalyst present in the range of about 0.01 mole to 0.0001 mole, at a temperature of about 0° C. to 100° C., for a time sufficient to remove the acyl group at the 2-position of the lincomycin molecule.

15. A process according to claim 7 for preparing lincomycin 7-acetate which comprises reacting 0.1 mole of lincomycin 2,3,4,7-tetraacetate with methanol in the presence of 0.045 mole of sodium methoxide, at a temperature of 25° C.

References Cited

UNITED STATES PATENTS

| | | | |
|---|---|---|---|
| 3,157,634 | 11/1964 | Druey et al. | 260—210 |
| 3,277,077 | 10/1966 | Holly et al. | 260—210 |
| 3,326,891 | 6/1967 | Hoeksema et al. | 260—210 |

OTHER REFERENCES

Fox et al.: "Jour. Amer. Chem. Soc." vol. 80, No. 7, pp. 1669–1675, Apr. 5, 1958.

LEWIS GOTTS, Primary Examiner

J. R. BROWN, Assistant Examiner